(12) United States Patent  
Bowen

(10) Patent No.: US 9,485,101 B2  
(45) Date of Patent: *Nov. 1, 2016

(54) PROVISIONING DIGITAL CERTIFICATES IN A NETWORK ENVIRONMENT

(71) Applicant: Amazon Technologies, Inc., Seattle, WA (US)

(72) Inventor: Peter Zachary Bowen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,861

(22) Filed: Mar. 30, 2016

(65) Prior Publication Data

US 2016/0211978 A1      Jul. 21, 2016

Related U.S. Application Data

(63) Continuation of application No. 14/189,262, filed on Feb. 25, 2014, now Pat. No. 9,306,935.

(51) Int. Cl.
| | |
|---|---|
| *H04L 9/32* | (2006.01) |
| *H04L 9/14* | (2006.01) |
| *H04L 9/30* | (2006.01) |
| *H04L 29/06* | (2006.01) |
| *H04L 9/00* | (2006.01) |

(52) U.S. Cl.
CPC ............ *H04L 9/3263* (2013.01); *H04L 9/14* (2013.01); *H04L 9/30* (2013.01); *H04L 63/0823* (2013.01); *H04L 9/006* (2013.01)

(58) Field of Classification Search
CPC ...................................... H04L 9/006

USPC ......................................................... 713/158  
See application file for complete search history.

(56) References Cited

U.S. PATENT DOCUMENTS

| | | |
|---|---|---|
| 7,484,089 B1 | 1/2009 | Kogen et al. |
| 8,249,654 B1 | 8/2012 | Zhu |

(Continued)

OTHER PUBLICATIONS

International Search Report dated Jun. 3, 2015, from corresponding International Application No. PCT/US2015/017232, 2 pages.

(Continued)

*Primary Examiner* — Jacob Lipman  
(74) *Attorney, Agent, or Firm* — Klarquist Sparkman, LLP

(57) ABSTRACT

A method for provisioning digital certificates in a compute service environment may include authorizing a customer entity for using and/or controlling a network resource in the compute service environment. Upon completing the authorization, a digital certificate may be issued to the customer entity. The digital certificate may be associated with the network resource and may be issued for a limited duration period. The use and/or control of the network resource by the customer entity may be monitored. Reissuance of the digital certificate may be conditioned on whether the customer entity is still using and/or controlling the network resource in the compute service environment. If the customer entity is still using and/or controlling the network resource in the multi-tenant environment, the digital certificate may be automatically reissued for another limited duration period. The automatically reissuing may take place without receiving a certificate reissue request from the customer entity.

20 Claims, 11 Drawing Sheets

(56) References Cited

U.S. PATENT DOCUMENTS

| | | |
|---|---|---|
| 8,473,735 B1 | 6/2013 | Jarvie et al. |
| 8,805,971 B1 | 8/2014 | Roth et al. |
| 2003/0041091 A1 | 2/2003 | Cheline et al. |
| 2005/0138388 A1 | 6/2005 | Paganetti et al. |
| 2006/0002556 A1 | 1/2006 | Paul |
| 2007/0234040 A1 | 10/2007 | Hurst et al. |
| 2008/0114984 A1 | 5/2008 | Srinivasan et al. |
| 2009/0141707 A1 | 6/2009 | Kavanaugh |
| 2011/0161662 A1 | 6/2011 | Lee et al. |
| 2011/0214124 A1 | 9/2011 | Ferris et al. |
| 2011/0282943 A1 | 11/2011 | Anderson et al. |
| 2012/0179907 A1 | 7/2012 | Byrd et al. |
| 2013/0238895 A1 | 9/2013 | Dixon et al. |
| 2013/0311771 A1 | 11/2013 | Hoggan |

OTHER PUBLICATIONS

Wikipedia, "Certificate Authority," Wikipedia.com, last modified Dec. 30, 2013, accessed Jan. 6, 2014, 7 pages.
Wikipedia, "Digital Signature," Wikipedia.com, last modified Jan. 3, 2014, accessed Jan. 6, 2014, 10 pages.
Wikipedia, "Public-key Cryptography," Wikipedia.com, last modified Jan. 6, 2014, accessed Jan. 6, 2014, 12 pages.
Written Opinion dated Jun. 3, 2015, from corresponding International Application No. PCT/US2015/017232, 7 pages.

PROVISIONING DIGITAL CERTIFICATES IN A NETWORK ENVIRONMENT

CROSS REFERENCE TO RELATED APPLICATION

This application is a continuation of U.S. patent application Ser. No. 14/189,262, filed Feb. 25, 2014, entitled "PROVISIONING DIGITAL CERTIFICATES IN A NETWORK ENVIRONMENT", which application is hereby incorporated by reference in its entirety.

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Additionally, secure communications in the cloud computing environment are an important consideration as they ensure authentication of the communicating parties, as well as integrity and security of the communication itself. However, the setup of secure communications can be a difficult task for the communicating parties in the cloud computing environment.

For example, entity authentication within the cloud computing environment may be based on digital certificates, which may have to be issued to multiple parties. The digital certificates are typically issued by a Certificate Authority (CA) in exchange for a fee and after the CA has completed an extensive and time-consuming authentication process. Once issued, the digital certificates can be used without any additional interaction with (or authentication by) the CA, which, in the case of extended validation certificates, can be a long period of time. Therefore, not only is the process of obtaining digital certificates time-consuming, but issuing certificates for an extended period of time may lead to unauthorized use of the certificates causing security breaches in the cloud computing environment.

BRIEF DESCRIPTION OF THE DRAWINGS

Various embodiments in accordance with the present disclosure will be described with reference to the drawings, in which.

DETAILED DESCRIPTION

Figure 1:
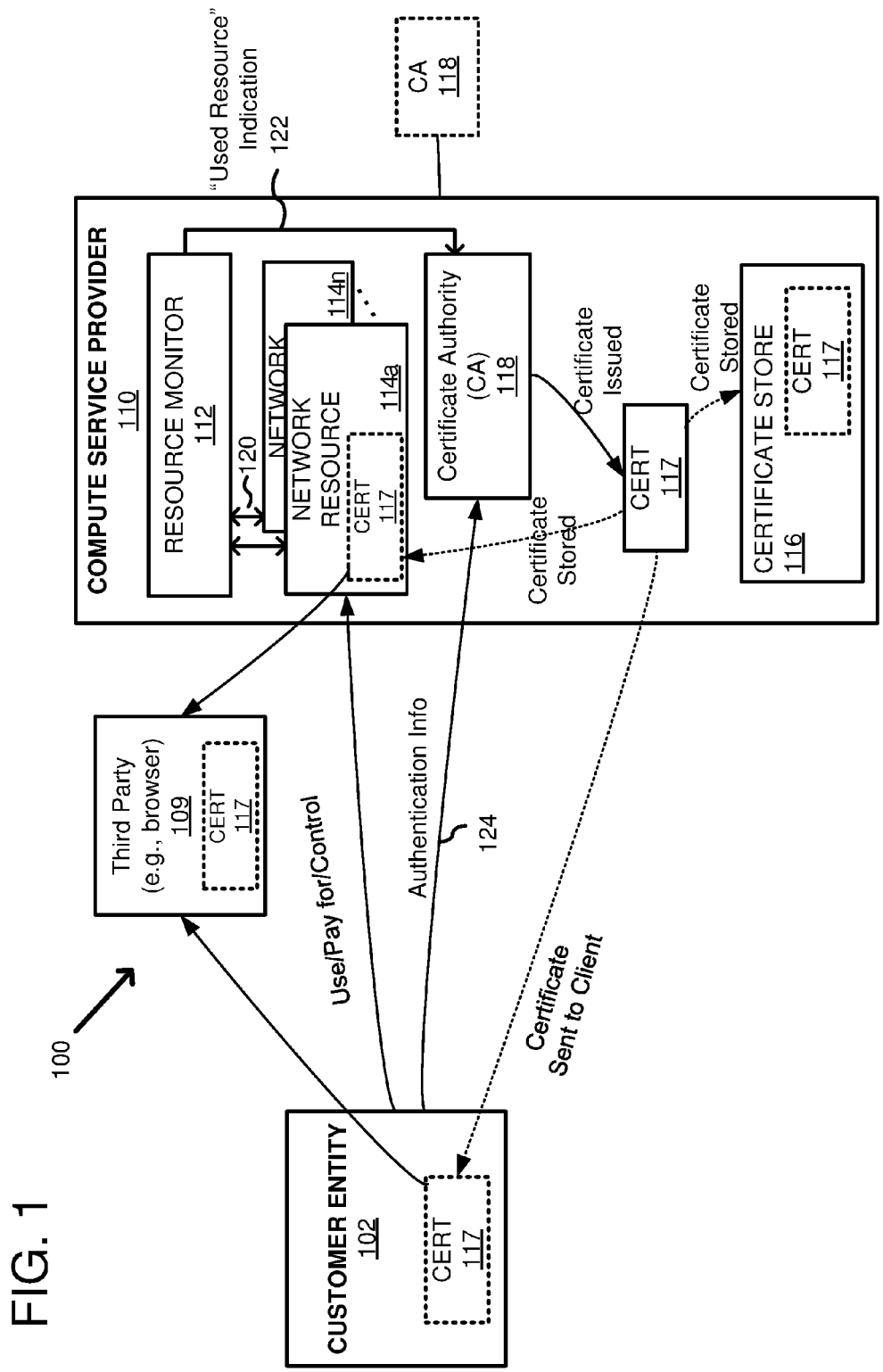
FIG. 1 is a diagram of an example network environment supporting provisioning of digital certificates, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

The following description is directed to techniques and solutions supporting provisioning of digital certificates in a network environment, such as a cloud computing multi-tenant network environment or another network environment (e.g., a compute service provider environment with a compute service provider). A customer entity may request a digital certificate by communicating a Certificate Signing Request (CSR) to a Certificate Authority (CA). The CA may perform identity and other verification of the requesting customer entity and information the customer entity is seeking to assert and get authorized by the CA (e.g., the domain name of the customer entity, identity of an officer of the customer entity requesting the certificate, customer entity address, authenticity of a public key of an asymmetric public-private key pair of the customer entity, and so forth). In this regard, the CA may require proof of ownership of the domain and identity of the domain owner (e.g., the customer entity) as well as the identity of the corporate office (or employee) requesting the certificate. Once the CA has completed the authentication process, the CA may issue a digital certificate associating the requesting customer entity with the public key. The digital certificate is also cryptographically signed by the issuing CA (e.g., using a private key of the CA), and can be traced through a hierarchy of CAs to a CA that is known and trusted. Typically, a digital certificate has an expiration date, at which point the customer entity may need to apply again (and pay a fee) for reissuing the certificate.

After issuance, the digital certificate can be used in the cloud computing multi-tenant network environment (as well as other Internet-based communications) to establish the identity of the customer entity and/or authenticity of one or more web sites or other network resources or services associated with the customer entity. Flexibility and reliability of digital certificate issuance and management may be improved by, for example, implementing the CA as part of the multi-tenant network environment. Additionally, digital certificates may be automatically provisioned as limited duration digital certificates that are associated with one or more network resources that are being used by the customer entity. In this regard, the limited duration digital certificates may be automatically reissued to the customer entity as long as the customer entity is continuing to use, pay for, and/or control at least one network resource (e.g., a virtual machine, a database, a network-related service, and so forth) within the cloud computing multi-tenant network environment.

As used herein, the term "provisioning a digital certificate" means enabling and providing a digital certificate-related service to a customer, which may include authorizing the customer to have a digital certificate, issuing the digital certificate to the customer, and managing the digital certificate after issuance (e.g., renewing, reissuing and/or revoking the digital certificate).

FIG. 1 is a diagram of an example network environment supporting provisioning of digital certificates, in accordance with an embodiment of the disclosure. Referring to FIG. 1, the network environment 100 may comprise a customer entity 102 and a compute service provider 110. The compute service provider 110 may be, for example, a cloud provider that is capable of delivery of computing and storage capacity as a service to a community of end recipients (e.g., tenants or customers), such as the customer entity 102. The compute service provider 110 may comprise a resource monitor 112, one or more network resources 114a, ..., 114n, a certificate authority (CA) 118, and a certificate store 116.

The CA 118 may comprise suitable circuitry, logic, and/or code and may be implemented within the compute service provider 110 to handle the issuance and management (e.g., reissuance and/or revocation) of digital certificates. The network resources 114a, ..., 114n may include one or more network resources associated with the compute service provider 110. For example, the network resources 114a, ..., 114n may include one or more of a virtual machine launched by the compute service provider 110 on behalf of the customer entity 102 (e.g., the customer entity 102 administered by the customer entity), a database managed (administered) by the customer entity using a resource that runs the database and is managed by the provider 110, and/or another network-related service (e.g., load balancing) that is provided (and managed by) the compute service provider 110. Even though CA 118 is implemented as part of the computer service provider 110, in other implementations the provider 110 may use the services of a CA that is implemented separately from the provider 110 (as indicated by the dashed lines in FIG. 1).

The resource monitor 112 may comprise suitable circuitry, logic, and/or code and may be operable to monitor usage/control of one or more of the network resources 114a, ..., 114n by the customer entity 102 via communication paths 120. For example, the resource monitor may be operable to monitor whether the customer entity 102 is paying for, using, and/or controlling a network resource. As used herein, the term "controlling a network resource" in reference to the customer entity 102 may mean that the customer entity 102 is the administrator of the network resource (e.g., the network resources is launched using the customer entity's account with the provider 110 and the customer entity is responsible for changing settings and other administrating functions with regard to the network resource). Using or controlling a network resource does not necessarily mean that the customer entity 102 is paying for it. Also, using the network resource does not necessarily mean that the customer entity 102 is controlling the network resource.

The resource monitor 112 may generate an indication 122, which may include a "used resource" indication, a "paid for resource" indication, and/or a "controlled resource" indication. The indication 122 may be communicated to the CA 118. In an example embodiment, the CA 118 may condition the issuance of a digital certificate upon receipt of the indication 122 from the resource monitor 112 that the customer entity is using, paying for, and/or controlling one or more of the network resources 114a, ..., 114n. Once issued, a digital certificate (e.g., 117) may be stored in the one or more network resources 114, in the certificate store 116 and/or communicated to the customer entity 102. The digital certificate 117 may then be communicated to a third party 109 (e.g., a browser) for purposes of authenticating the customer entity with the third party 109.

In operation, the customer entity 102 may send authentication information 124 (e.g., a request for a digital certificate, one or more public and/or private keys, domain information, customer address information, corporate officer information, and other authentication information) to the CA 118. The requested digital certificate may be associated with one or more network resources (e.g., 114a, ..., 114n) that are being used, paid for and/or controlled by the customer entity 102. Several examples of issuing digital certificates in a cloud computing multi-tenant network environment are discussed herein below.

Example 1

The customer entity may be paying for and using (e.g., renting) a virtual machine provided by the compute service provider 110. In this case, the virtual machine is run by the customer entity (e.g., using an account of the customer entity with the provider 110). The CA 118 may then issue the digital certificate 117 to the customer entity 102, associating the certificate 117 with the specific virtual machine being rented by the customer entity 102 (i.e., the certificate 117 is issued for, and identifies, the specific virtual machine). The name of the virtual machine (or any other resource being paid for, used and/or controlled by the customer entity 102) may be set (and reflected on the certificate 117) by the compute service provider 110. The certificate 117 may be issued for a limited duration (e.g., one or more days, hours, or minutes), and its reissuance may be dependent upon the continued use (renting) of the virtual machine by the customer entity 102. Thus, use of a resource or service of the compute service provider and a relationship between a customer entity and the resource or service can be sufficient to automatically reissue the digital certificate for continued use thereof. For example, the relationship can be that the customer entity purchases use on behalf of another third-party entity, or the customer entity acts as an administrator of the resource or service. Reissuance can occur automatically through tracking the expiration date and ensuring reissuance prior to expiration.

Example 2

In another instance, the name of the virtual machine for purposes of issuing the digital certificate (or any other resource being paid for, used and/or controlled by the customer entity 102) may be selected by the customer entity 102. For example, the customer entity 102 may select a specific virtual machine and request a digital certificate issued for the selected machine. In this regard, the name of the virtual machine for purposes of issuing the digital certificate is being selected by the customer by virtue of selecting which virtual machine the digital certificate will be associated with. After the CA 118 authenticates the customer entity 102 using the authentication information 124, the CA 118 may issue a digital certificate 117 for a limited duration and its reissuance may be dependent upon the continued use (renting) of the virtual machine selected by the customer entity 102.

Example 3

The customer entity may request a certificate from the CA 118 for a resource other than the network resources 114*a*, . . . , 114*n*. For example, the customer entity 102 may be using a service administered by the provider 110 (e.g., load balancing). In this instance, the CA 118 may issue a short-term certificate 117, which may be associated with the resource identified by the customer entity. The reissuance of the certificate may be conditioned upon the customer continuing to pay for and use the service administered by the provider 110.

Example 4

The customer entity may be using a network resource (e.g., 114*a*) and may request a digital certificate from the CA 118. In this case, the provider 110 may issue the requested digital certificate for a limited duration and require that the customer entity 102 not only pay for and use the network resource 114*a*, but also pay a separate fee for the issuance of the certificate for the limited duration. If the customer entity 102 decides that the certificate is no longer needed (e.g., at some point after issuance of the certificate and payment of the certificate fee for using the certificate for a limited duration period), the provider 110 may not renew/reissue the certificate and the certificate will expire at the end of the limited duration period.

Figure 2:
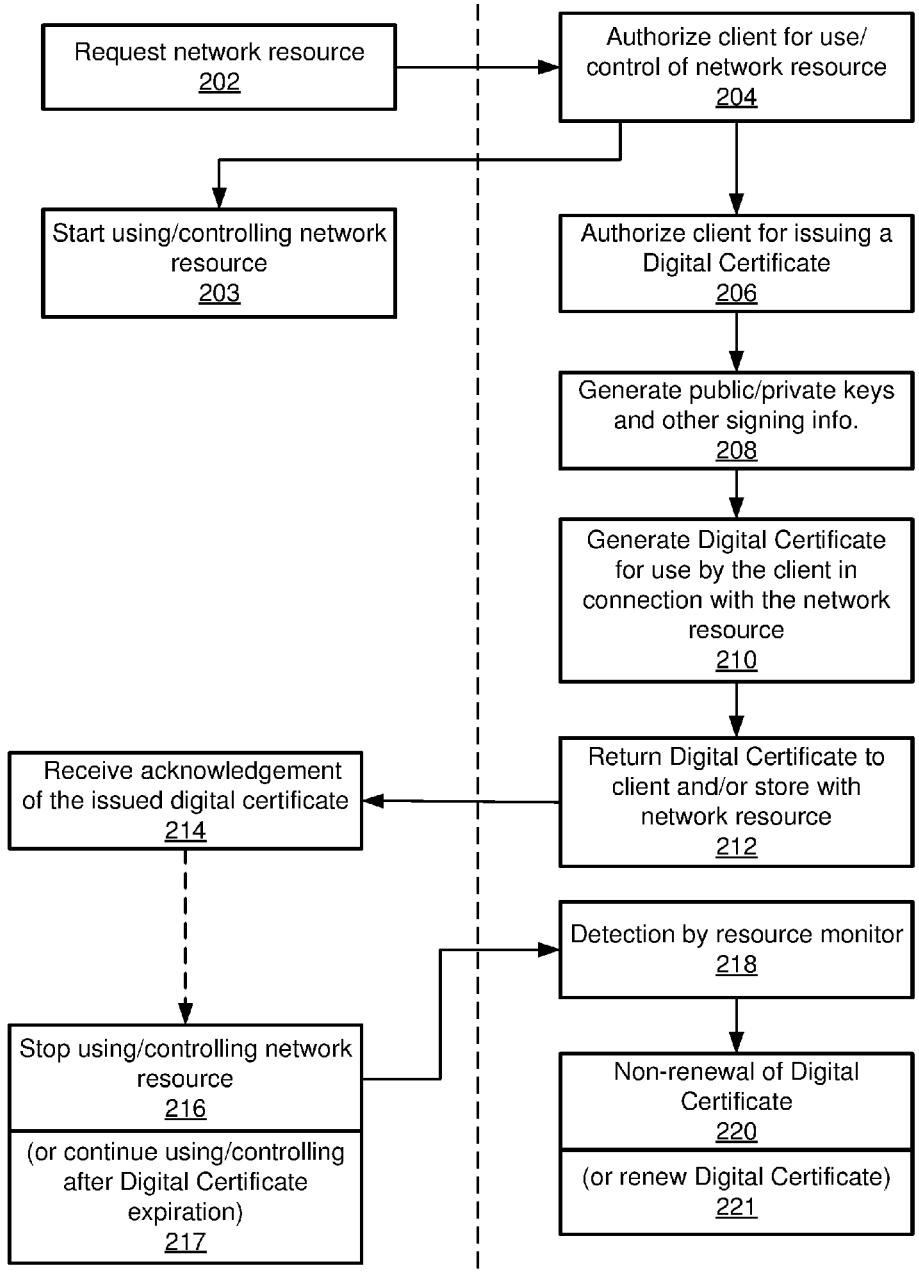
FIGS. 2-4 are flow diagrams illustrating provisioning of digital certificates to a customer entity in a network environment, in accordance with various embodiments of the disclosure.
Figure 3:
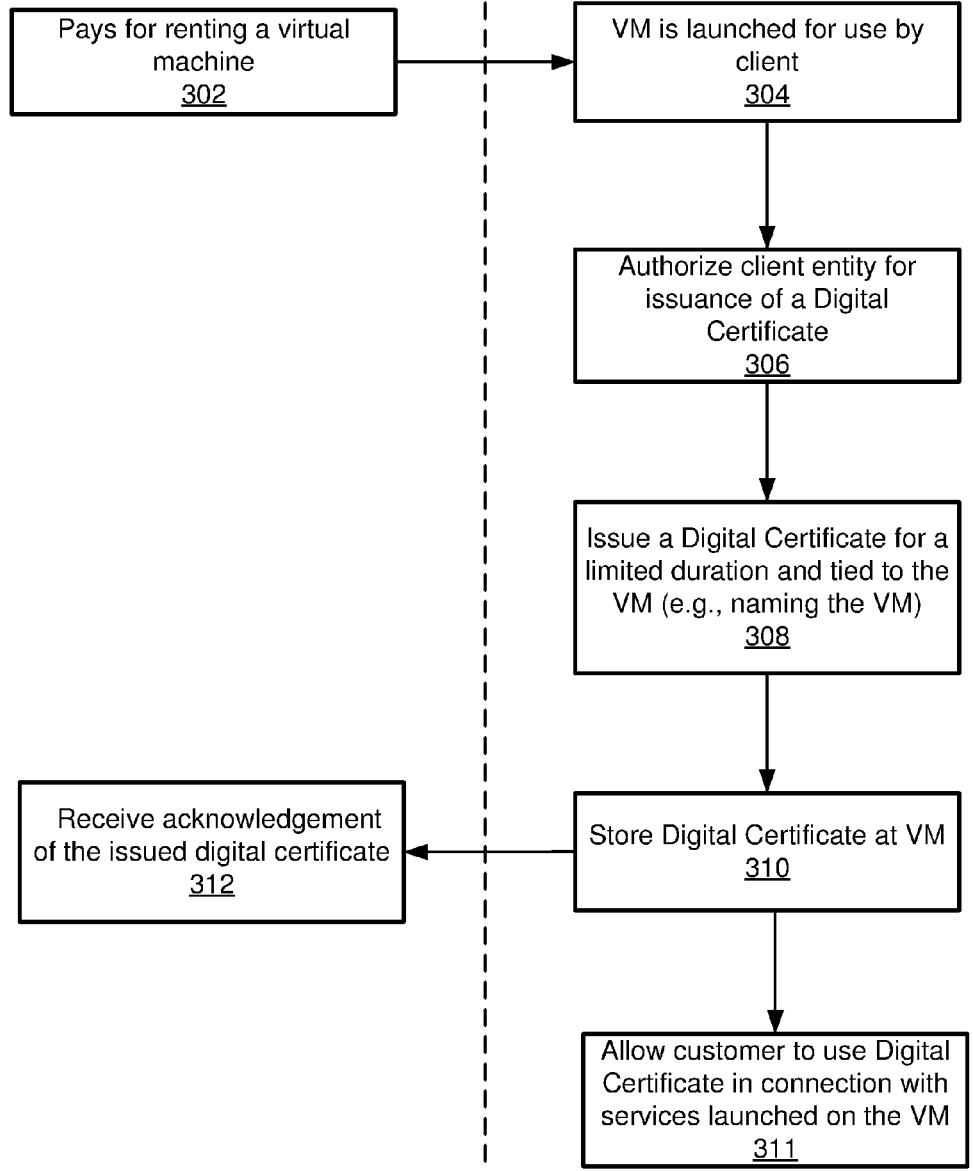
Figure 4:
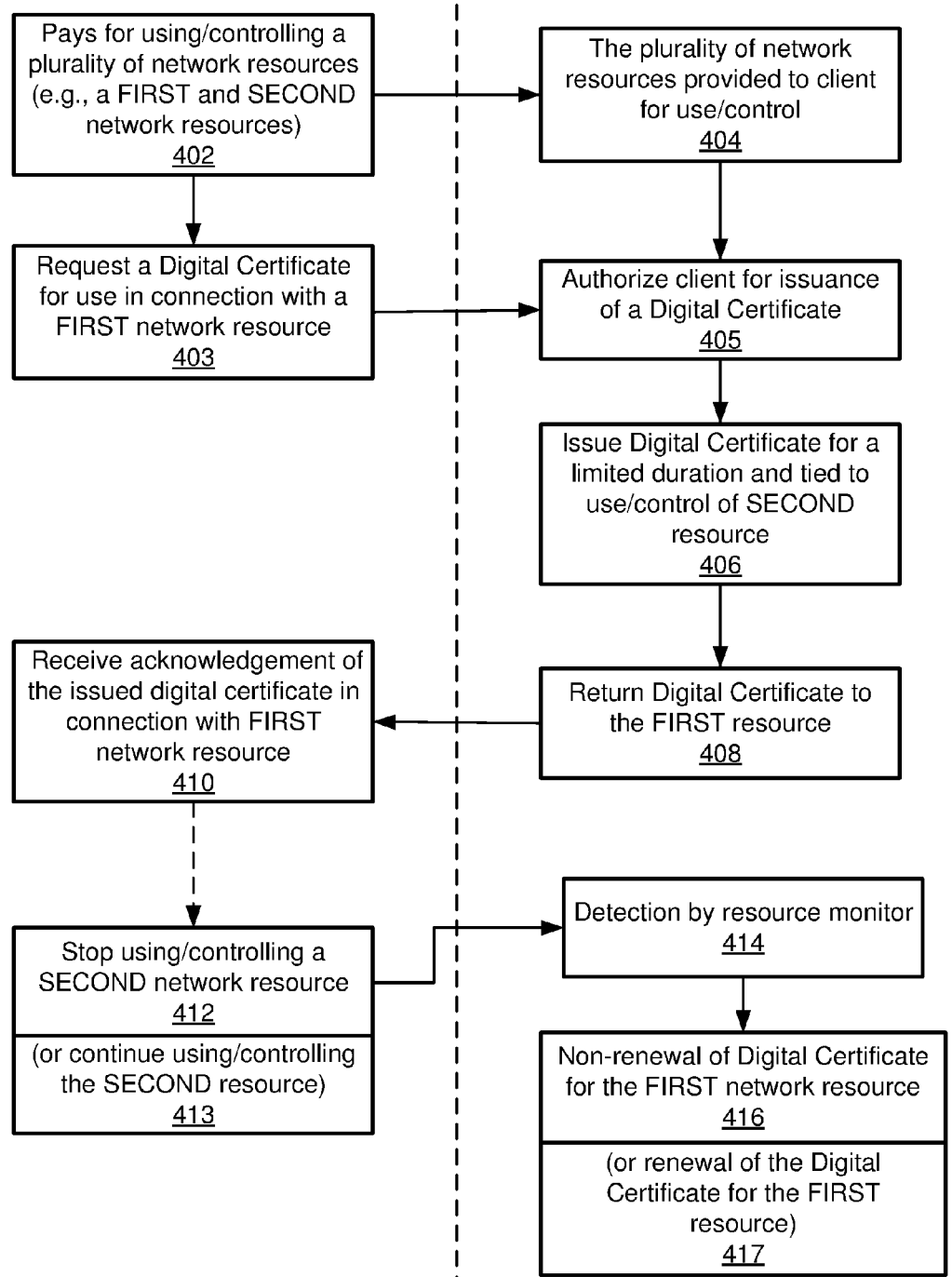

FIGS. 2-4 are flow diagrams illustrating provisioning of digital certificates to a customer entity in a network environment, in accordance with various embodiments of the disclosure. Referring to FIGS. 1 and 2, there are illustrated actions that may be performed by the customer entity 102 (on the left side of the page) and actions that may be performed by the compute service provider 110 (on the right side of the page) in connection with provisioning of digital certificates.

An action 202 may comprise requesting (by the customer entity 102) a network resource. For example, the customer entity 102 may request to use one or more network resources selected from the available network resources 114*a*, . . . , 114*n* (e.g., the customer entity 102 may pay a fee and rent a virtual machine from the provider 110). Action 204 may be performed by the provider 110 and may include authorizing the customer entity 102 for using and/or controlling the requested network resource. The authorization process may include receiving desired settings for the network resource as well as payment of a fee for using/controlling the resource.

Action 203 may be performed by the customer entity 102 and may include initiating the user and/or control of the network resource authorized by the provider 110. Subsequent to the authorization action at 204, the provider 110 may also perform action 206 by authorizing the customer entity for issuing a digital certificate. For example, the customer entity 102 may have requested (e.g., at action 202) a digital certificate to use with the network resource. In this regard, the customer entity 102 may also send the provider 110 authentication information (e.g., 124). At action 208 and after the customer entity has been authorized for a digital certificate, the CA 118 may generate one or more public/private keys, which may be used for the digital certificate generation. In other instances, the CA 118 may use a public key of the customer entity 102, which has been communicated to the CA 118 with the authentication information 124 (the customer entity 102 having possession of the private key).

At 210, the CA 118 may use the authentication information (including the generated private/public key pair) to generate a digital certificate (e.g., certificate 117) for use by the customer entity 102 in connection with the network resource that is being used, controlled and/or paid for by the customer entity 102. the digital certificate may be issued for a short (fixed) duration and may identify the specific network resource being used, controlled and/or paid for by the customer (or another network resource that the customer needs certificate for). The generated certificate may be additionally signed by the CA 118 (e.g., by a private key of the CA 118) to further authenticate the certificate. Regardless of which resource the certificate is issued for, the continued use (and renewal) of the certificate may be dependent on the customer entity continuing to use, control and/or pay for a given network resource of the provider 110.

At 212, the issued digital certificate (e.g., 117) may be returned to the customer entity and/or stored with the network resource. At 214, the customer entity 102 may receive an acknowledgement of the issued digital certificate (if certificate was stored at the network resource), or may store the digital certificate (e.g., at a local certificate store managed by the customer entity 102, if the certificate was sent to the customer).

At 216, the customer entity may stop using, controlling and/or paying for the requested network resource (e.g., 114*a*). At 218, the resource monitor 112 may detect the stoppage by the customer entity 102, and may provide a stoppage indication 122 to the CA 118. The CA 118 may then not reissue/renew the digital certificate upon its expiration (action 220). As an alternative, the customer entity may (at 217) continue using, controlling and/or paying for the network resource 114*a* even after the previously issued short-term digital certificate has expired. The resource monitor 112 may send an indication 122 notifying the CA 118 of the continued use of the network resource, and the CA 118 may renew the digital certificate (at 221).

Referring to FIGS. 1 and 3, there are illustrated actions that may be performed by the customer entity 102 (on the left side of the page) and actions that may be performed by the compute service provider 110 (on the right side of the page) in connection with provisioning digital certificates for a virtual machine. At 302, the customer entity 102 may pay for renting a virtual machine (e.g., 114*a*) of the provider 110. At 304, the provider 110 may launch the virtual machine 114*a*, after the customer entity has been authorized for using the virtual machine 114*a*, settings of the virtual machine have been determined (e.g., set by the customer and/or the provider 110), and payment from the customer has been received by the provider 110.

After the virtual machine 114*a* is launched, the provider may (at 306) authorize the customer entity 102 for the issuance of a digital certificate associated with the virtual machine 114*a*. At 308, the CA 118 may issue the digital certificate (e.g., 117) for a limited duration and associating the certificate to the virtual machine 114a (e.g., the certificate lists/names the virtual machine 114a in the certificate) so that the customer entity may use the certificate 117 in connection with providing services (e.g., to consumers) or any other services or functionalities using the virtual machine 114a and requiring the use of a digital certificate. At 310, the provider 110 may store the issued digital certificate at the VM. At 312, the customer entity 102 may receive an acknowledgement of the issued digital certificate. At 311, the CSP 110 may allow the customer to use the digital certificate in connection with services launched on the virtual machine 114a.

Referring to FIGS. 1 and 4, there are illustrated actions that may be performed by the customer entity 102 (on the left side of the page) and actions that may be performed by the compute service provider 110 (on the right side of the page) in connection with provisioning digital certificates for a first network resource, with the certificate renewal being dependent upon the customer entity using, controlling and/or paying for a second network resource. For example, at 402, the customer entity 102 may pay for using and/or controlling a plurality of network resources (e.g., 114a and 114b) of the provider 110. After authorizing the customer entity, the provider may (at 404) provide the network resources 114a and 114b to the customer entity for using and/or controlling.

At 403, the customer entity 102 may request a digital certificate to use in connection with the network resource 114a. Authorization information (e.g., 124) may be sent to the CA 118, and the CA 118 may authorize (at 405) the customer entity for a digital certificate for use with network resource 114a. At 406, the CA 118 may issue the digital certificate for a short duration and tying it to use and/or control of the network resource 114b by the customer entity 102. At 408, the generated digital certificate (e.g., 117) is returned to the first network resource 114a. At 410, the customer entity 102 may receive an acknowledgement of the issued digital certificate in connection with the network resource 114a.

At 412, the customer entity 102 may stop using, controlling and/or paying for the network resource 114b. At 414, the resource monitor 112 may detect the stoppage by the customer entity 102, and may provide a stoppage indication 122 to the CA 118. The CA 118 may then not reissue/renew the digital certificate for the network resource 114a upon its expiration (action 416). As an alternative, the customer entity may (at 413) continue using, controlling and/or paying for the second network resource 114b even after the previously issued short-term digital certificate for the first resource 114a has expired. The resource monitor 112 may send an indication 122 notifying the CA 118 of the continued use/control of the second network resource 114b, and the CA 118 may renew the digital certificate for the first resource 114a (at 417).

Figure 5:
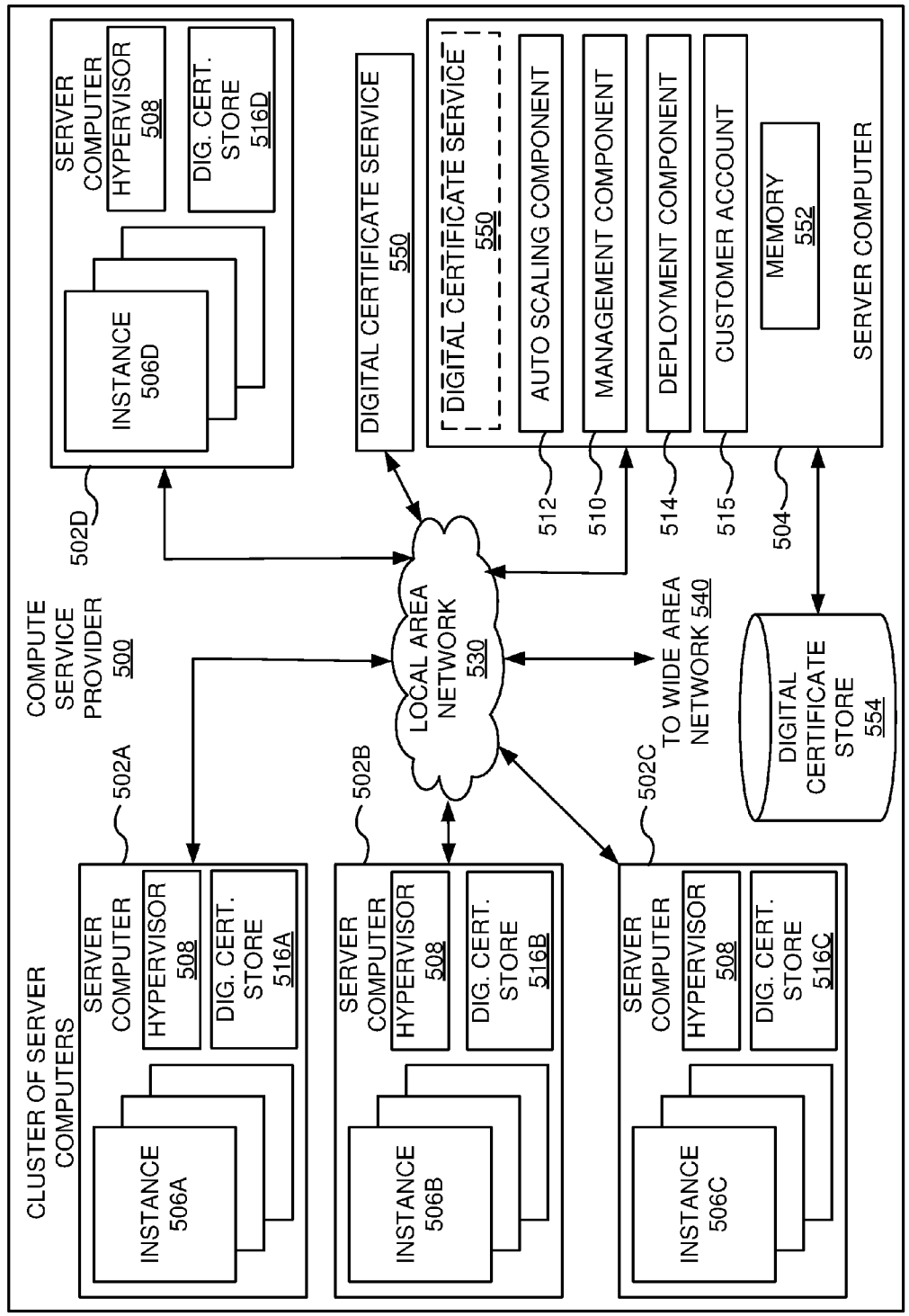
FIG. 5 is an example system diagram showing a plurality of virtual machine instances running in a multi-tenant environment, using a digital certificate service, in accordance with an example embodiment of the disclosure.

FIG. 5 is an example system diagram showing a plurality of virtual machine instances running in a multi-tenant environment, using a digital certificate service, in accordance with an example embodiment of the disclosure. More specifically, FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients (e.g., tenants or customers).

In an example embodiment, the compute service provider 500 can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e., a computer) that executes applications like a physical machine. In the example, each of the server computers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine partitions, with each virtual machine partition capable of running a virtual machine instance (e.g., server computer 502A could be configured to support three virtual machine partitions each running a corresponding virtual machine instance). Additionally, each of the instances 506 can be configured to execute one or more applications.

In an example embodiment, each of the server computers 502A-502D may also comprise a digital certificate store (516A-516D) communicatively coupled to the network 530. The digital certificate store 516 may comprise suitable circuitry, logic, and/or code and may be operable to store one or more digital certificates that have been issued in connection with at least one instance running on a corresponding server computer 502.

The compute service provider 500 may also comprise a digital certificate service 550. The digital certificate service 550 may comprise suitable circuitry, logic, and/or code and may be operable to monitor usage of network resources of the provider 500, as well as issue, renew and/or revoke digital certificates in connection with one or more of the network resources (e.g., instances 506 and/or other services associated with the server computers 502) of the provider 500. In this regard, the digital certificate service may implement one or more of the functionalities described herein that are performed by the resource monitor 112 and/or the CA 118 (in FIG. 1). Digital certificates that have been generated and managed by the digital certificate service 550 may be communicated to a corresponding server computer 502 that is associated with the network resource (e.g., an instance 506) the certificate is tied to. The digital certificate may then be stored locally, by the digital certificate store 516 of the corresponding server computer 502. As an alternative, the generated digital certificate may also be stored by the digital certificate store 554 associated with the managing server computer 504, and communicated to the corresponding server computer as needed (e.g., upon request by a client entity that is using, controlling, and/or paying for an instance).

Figure 6:
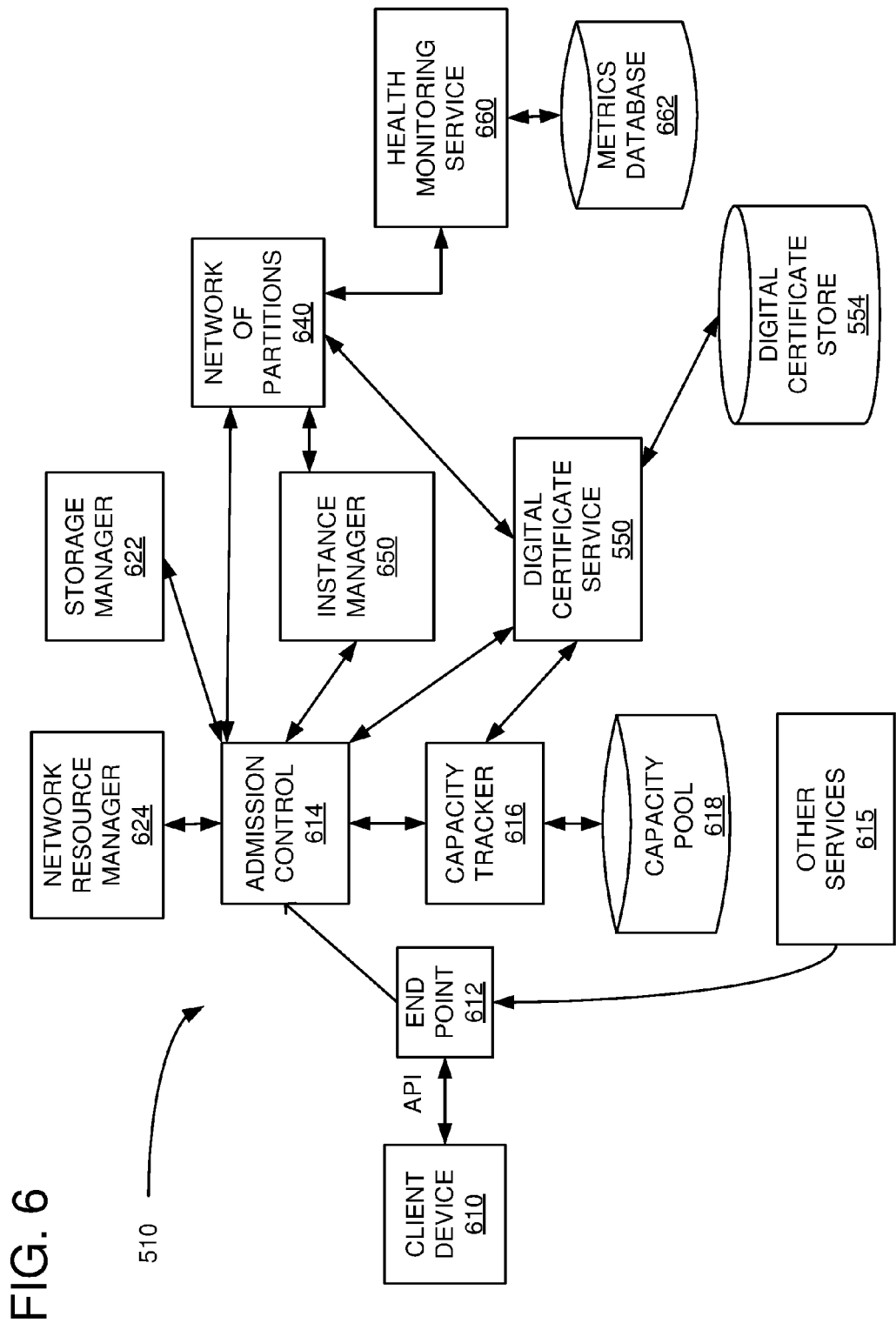
FIG. 6 shows further details of an example system including a plurality of management components associated with a control plane, which may be used to manage a digital certificate service according to one embodiment.

The digital certificate service 550 may be implemented as a stand-alone service within the provider 500, as a dedicated server (similar to the servers 502A-502D), and/or may be implemented as part of the server computer 504 that performs management functions. For example, the digital certificate service 550 may be implemented as part of the management component 510 (as seen in FIG. 6).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502, the instances 506, the hypervisors 508, and/or the sensors 516. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component 510 can further include a policy document to implement customer policies (e.g., configuration policies as discussed in reference to FIG. 1).

The server computer 504 may further comprise memory 552 and a digital certificate store 554. The memory 552 may be used as processing memory by one or more of the placement manager 550 and/or the components 510, . . . , 515. The digital certificate store 554 may be used to store digital certificates (as explained above), as well as it may include one or more databases for storing and maintaining customer account information (e.g., authorization information used to authorize use/control of a network resource by a client entity and/or authorization information used by the digital certificate service 550 to authorize client entities for issuing digital certificates). The digital certificate store 554 may be implemented as part of the placement manager 550 and/or any of the other components of the server computer 504 (e.g., as part of the management component 510).

An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 530 can be utilized to interconnect the server computers 502A-502D and the server computer 504. The network 530 can be a local area network (LAN) and can be connected to a Wide Area Network (WAN) 540 so that end-users can access the compute service provider 500. It should be appreciated that the network topology illustrated in FIG. 5 has been simplified and that many more networks and networking devices can be utilized to interconnect the various computing systems disclosed herein.

FIG. 6 shows further details of an example system including a plurality of management components associated with a control plane, which may be used to manage a digital certificate service according to one embodiment. More specifically, FIG. 6 illustrates in further detail management component 510, which may implement the digital certificate service 550 and the digital certificate store 554 within the multi-tenant environment of the compute service provider 500.

In order to access and utilize instances (such as instances 506 of FIG. 5), a client device can be used. The client device 610 can be any of a variety of computing devices, mobile or otherwise, including a cell phone, smartphone, handheld computer, Personal Digital Assistant (PDA), desktop computer, etc. The client device 610 can communicate with the compute service provider 500 through an end point 612, which can be a DNS address designed to receive and process application programming interface (API) requests. In particular, the end point 612 can be a web server configured to expose an API. Using the API requests, a client device 610 can make requests to implement any of the functionality described herein (e.g., request to authorize control, usage and/or payment for a network resource and/or issuing a digital certificate in connection with one or more network resources). Other services 615, which can be internal to the compute service provider 500, can likewise make API requests to the end point 612. For example, the client device 610 may use the API requests to communicate a customer request for launching an instance and requesting a digital certificate associated with such instance.

Other general management services that may or may not be included in the compute service provider 500 (and/or within the management component 510) include an admission control 614, e.g., one or more computers operating together as an admission control web service. The admission control 614 can authenticate, validate and unpack the API requests for service or storage of data within the compute service provider 500. The capacity tracker 616 is responsible for determining how the servers need to be configured in order to meet the need for the different instance types by managing and configuring physical inventory in terms of forecasting, provisioning, and real-time configuration and allocation of capacity. The capacity tracker 616 maintains a pool of available inventory in a capacity pool database 618. The capacity tracker 616 can also monitor capacity levels so as to know whether resources are readily available or limited.

An instance manager 650 controls launching and termination of instances in the network. When an instruction is received (such as through an API request) to launch an instance, the instance manager 650 pulls resources from the capacity pool 618 and launches the instance on a decided upon host server computer. Similar to the instance manager are the storage manager 622 and the network resource manager 624. The storage manager 622 relates to initiation and termination of storage volumes, while the network resource manager 624 relates to initiation and termination of routers, switches, subnets, etc. A network of partitions 640 is described further in relation to FIG. 7 and includes a physical layer upon which the instances are launched.

The digital certificate service 550 may communicate with the capacity tracker 616 to receive information regarding available partitions and/or host servers that can be used for launching an instance (or other network resources requested by a client entity). Additionally, communications with the admission control 614 may be used to launch an instance, and communications with the network of partitions 640 may be used to push configuration changes as well as digital certificates onto hardware and/or software resources of the host servers in order to effectuate functionalities described herein (e.g., a digital certificate may be pushed to a corresponding server computer hosting the instance that is associated with the digital certificate, and then stored at the digital certificate store 516 at the corresponding server computer).

Figure 7:
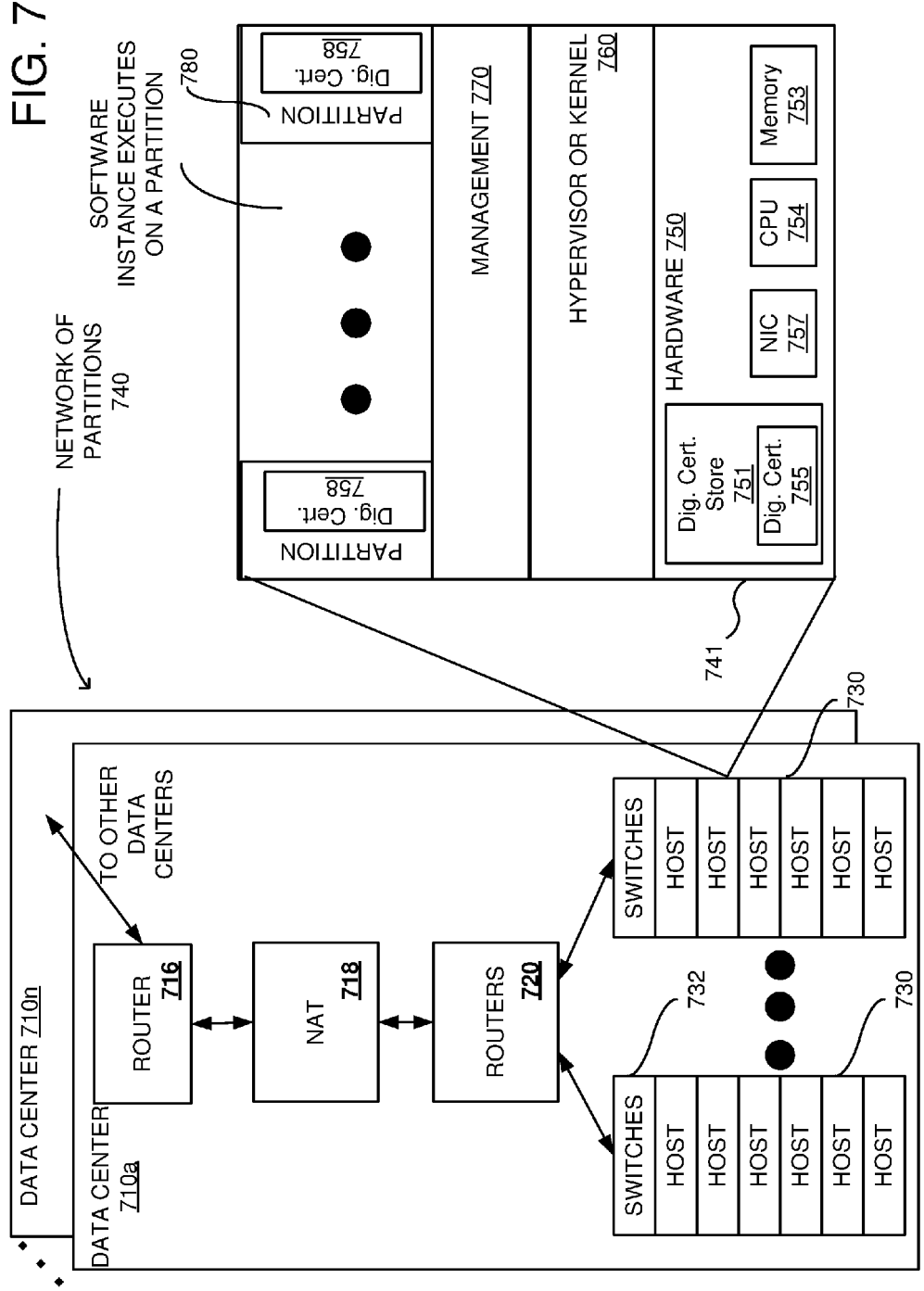
FIG. 7 shows an example of a plurality of host computers, routers, and switches—which are hardware assets used for running virtual machine instances—with the host computers having digital certificates-related functionalities that may be configured according to one embodiment.

FIG. 7 shows an example of a plurality of host computers, routers, and switches—which are hardware assets used for running virtual machine instances—with the host computers having digital certificates-related functionalities that may be configured according to one embodiment. More specifically, FIG. 7 illustrates the network of partitions 740 and the physical hardware associated therewith. The network of partitions 740 can include a plurality of data centers, such as data centers 710a, . . . , 710n, coupled together by routers, such as router 716.

The router 716 reads address information in a received packet and determines the packet's destination. If the router decides that a different data center contains a host server computer, then the packet is forwarded to that data center. If the packet is addressed to a host in the data center 710a, then it is passed to a network address translator (NAT) 718 that converts the packet's public IP address to a private IP address. The NAT 718 also translates private addresses to public addresses that are bound outside of the data center 710a. Additional routers 720 can be coupled to the NAT 718 to route packets to one or more racks 730 of host server computers. Each rack 730 can include a switch 732 coupled to multiple host server computers. A particular host server computer is shown in an expanded view at 741.

Each host 741 has underlying hardware 750 including a network interface card (NIC) 757, one or more CPUs (e.g., processor 754), memory (e.g., memory 753), a digital certificate store 751, etc. The digital certificate store 751 within the hardware layer 750 may be used for storing one or more digital certificates (e.g., 755) associated with one or more of the partitions 780.

Running a layer above the hardware 750 is a hypervisor or kernel layer 760. The hypervisor or kernel layer 760 can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 770 can be part of the hypervisor or separated therefrom, and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine, its own guest operating system, and its digital certificate 758 (e.g., associated with the virtual machine running on the corresponding partition). As such, each partition 780 is an abstract portion of capacity designed to support its own virtual machine independent of the other partitions.

In accordance with an example embodiment of the disclosure, a digital certificate service (e.g., 550) may be used to implement functionalities related to provisioning of digital certificates as described herein.

Figure 8:
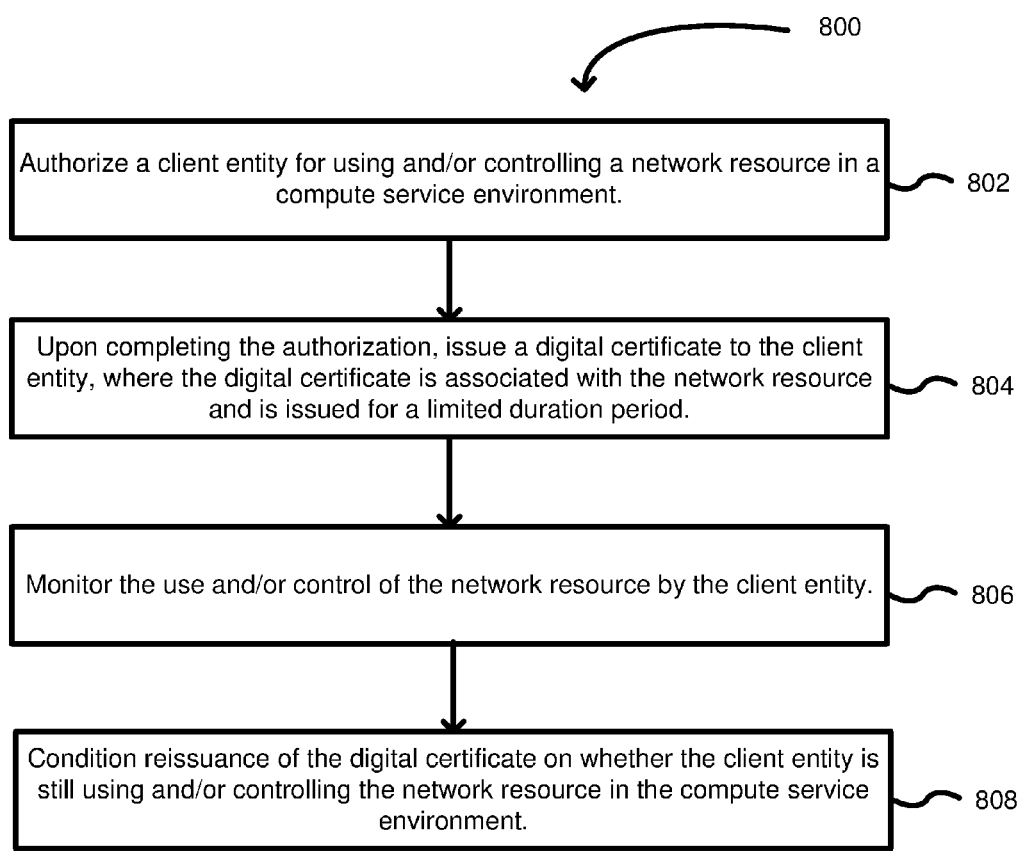
FIG. 8 is a flowchart of an example method for provisioning digital certificates in a compute service environment, in accordance with an embodiment of the disclosure.

FIG. 8 is a flowchart of an example method for provisioning digital certificates in a compute service environment, in accordance with an embodiment of the disclosure. Referring to FIGS. 1 and 8, the example method 800 may start at 802 when a customer entity may be authorized for using and/or controlling a network resource in a compute service environment (e.g., a multi-tenant environment or another network environment). For example, the customer entity 102 may be authorized by the compute service provider 110 for using one or more of the network resources 114a, . . . , 114n. The authorizing may also include authorizing the customer entity for issuing a digital certificate in connection with the network resource. At 804, upon completing the authorization, a digital certificate may be issued to the customer entity. For example, upon completing the authorization, the CA 118 may issue a digital certificate 117, where the digital certificate 117 is associated with the authorized network resource (e.g., 114a) and is issued for a limited duration period.

At 806, the resource monitor 112 may monitor the use and/or control of the network resource (e.g., 114a) by the customer entity 102. As used herein, the term "monitor" and "monitoring" mean that the compute service provider 110 may ping the management layer (e.g., 770) of the host server (e.g., 741) to determine if the VM is still active. If a response is received from the management layer, it may include metadata associated with a customer account of the VM. Then, the resource monitor 112 may match the customer account associated with the digital certificate with the customer account of the VM. If they match, then the resource monitor 112 may determine that the VM is still active by the customer and an indication 122 to that effect may be communicated to the CA 118 (as explained below in reference to step 808). The resource monitor 112 may perform such monitoring at a predetermined duration of time prior to the expiration of the digital certificate issued to the customer entity using the VM.

At 808, the reissuance of the digital certificate 117 may be conditioned on whether the customer entity 102 is still using and/or controlling the network resource (e.g., 114a) in the multi-tenant environment. If the customer entity 102 is still using and/or controlling the network resource in the multi-tenant environment, the resource monitor 112 may communicate an indication 122 of such continued use to the CA 118, and the CA 118 may automatically reissue the digital certificate for another limited duration period. The automatic reissuing may takes place without receiving a certificate reissue request from the customer entity 102.

The authorizing may be in connection with a first network resource (e.g., 114a), and the digital certificate 117 may be automatically issued to the customer entity 102, where the digital certificate 117 may identify the first network resource (e.g., 114a) and may be associated with usage of the first network resource by the customer entity 102.

In another instance, the authorizing may be in connection with a first network resource (e.g., 114a) and a second network resource (e.g., 114b). After the provider 110 receives a request for issuing a digital certificate in connection with the second network resource (114b), the CA 118 may automatically issuing the digital certificate in connection with the second network resource. The issuance of the digital certificate for the second network resource (114b) may be conditioned upon usage and/or control of the first network resource (114a) by the customer entity 102. Reissuance of the digital certificate in connection with the second network resource may be conditioned on whether the customer entity 102 is still in control of, and/or using, the first network resource (114a).

Figure 9:
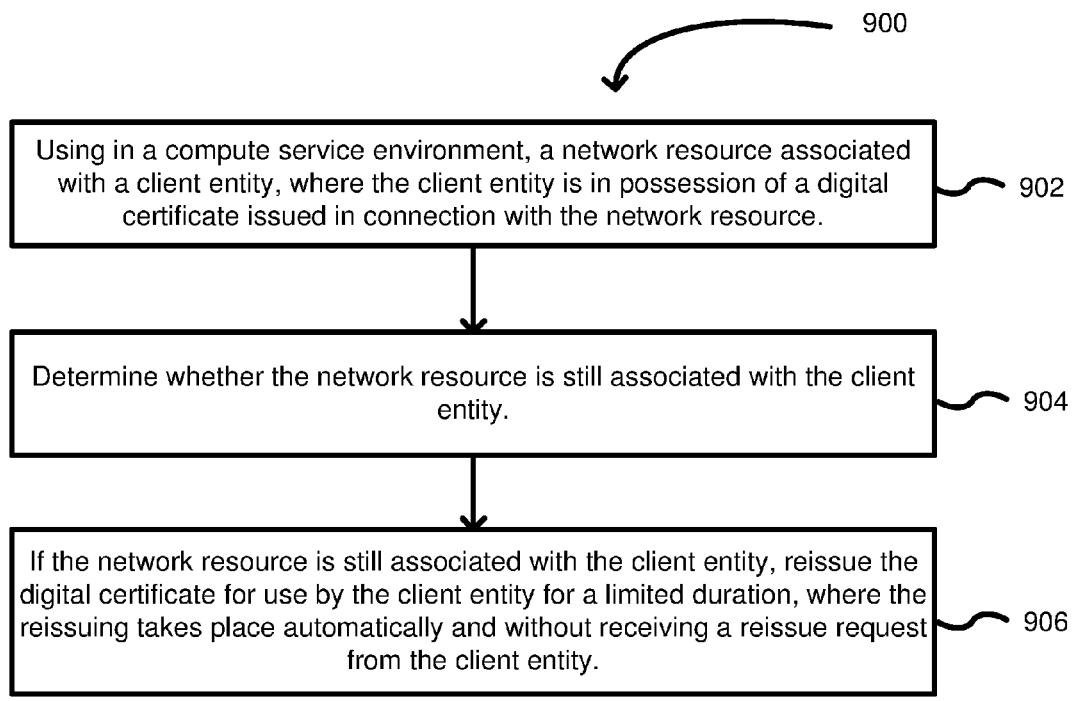
FIG. 9 is a flowchart of another example method for provisioning digital certificates in a compute service environment, in accordance with an embodiment of the disclosure.

FIG. 9 is a flowchart of another example method for provisioning digital certificates in a compute service environment, in accordance with an embodiment of the disclosure. Referring to FIGS. 1 and 9, the example method 900 may start at 902 when a network resource associated with a customer entity (e.g., 114a) may be used (e.g., by the provider 110) in a compute service environment (e.g., a multi-tenant environment or another network environment). The customer entity 102 may be in possession of a digital certificate issued in connection with the launched network resource (e.g., 114a). At 904, the provider 110 may determine whether the network resource (114a) is still associated with the customer entity (e.g., the resource monitor 112 may determine if the customer entity is still using, controlling, and/or paying for the network resource 114a). At 906, if the network resource (114a) is still associated with the customer entity (e.g., the customer entity 102 is still using, controlling and/or paying for the resource), the digital certificate associated with the network resource (114a) may be reissued (e.g., by the CA 118) for use by the customer entity for a limited duration. The reissuing may take place automatically and without receiving a reissue request from the customer entity. The determining may include determining whether the network resource is used by the customer entity, paid for by the customer entity, and/or controlled by the customer entity 102.

The digital certificate (e.g., 117) issued to the customer entity for the network resource (114a) may associate a public cryptographic key with the customer entity 102, the public cryptographic key corresponding to a private cryptographic key. The private and public key pair may be generated by the CA 118. For example, the CA 118 may generate the public cryptographic key and the private cryptographic key upon authorizing the customer entity 102 for usage and/or control of the network resource (114a) in the multi-tenant environment. The private cryptographic key may be managed by the CA 118 and may be inaccessible to the customer entity 102. The network resource may include one or more of a virtual machine, a database, and/or a service used, controlled by and/or paid for by the customer entity 102.

Figure 10:
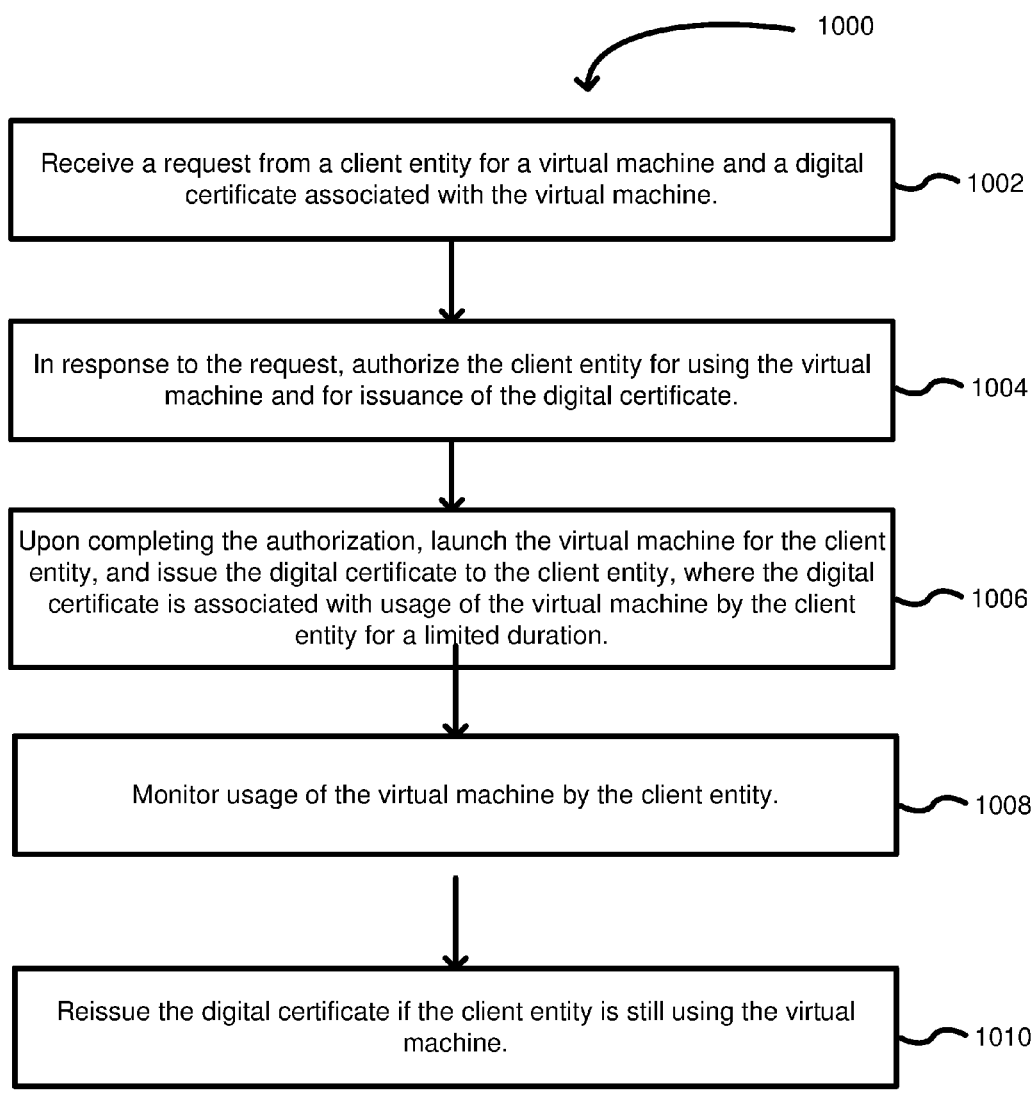
FIG. 10 is a flowchart of yet another example method for provisioning digital certificates, in accordance with an embodiment of the disclosure.

FIG. 10 is a flowchart of yet another example method for provisioning digital certificates, in accordance with an embodiment of the disclosure. Referring to FIGS. 1 and 10, the example method 1000 may start at 1002, when a request from a customer entity (102) for a virtual machine (e.g., 114a) and a digital certificate associated with the virtual machine may be received (e.g., by the provider 110). At 1004, in response to the request, the provider 110 may authorize the customer entity 102 for using the virtual machine (114a) in the multi-tenant environment and for issuance of the digital certificate. At 1006, upon completing the authorization (which may include authorization for purposes of issuing a digital certificate), the provider 110 may launch the virtual machine (114a) for the customer entity (102). The CA 118 may then issue the digital certificate (117) to the customer entity, where the digital certificate (117) may be associated with usage and/or control of the virtual machine (114a) by the customer entity for a limited duration. At 1008, the resource monitor 112 may monitor usage and/or control of the virtual machine by the customer entity (102). At 1010, the CA 118 may reissue the digital certificate (117), if the customer entity is still using the virtual machine (114a).

The CA 118 may automatically reissue the digital certificate upon receiving an indication (e.g., 122) that the customer entity is still using the virtual machine and an indication that the customer entity is still requesting a digital certificate for the virtual machine. The digital certificate (117) may also be automatically reissued by the CA 118 upon receiving a payment from the customer entity for continued use of the virtual machine and for reissuing the digital certificate.

The authorizing of the customer entity may include receiving payment from the customer entity for using the virtual machine and for the issuance of the digital certificate. The virtual machine may be associated with a customer account of the customer entity (102) within the multi-tenant network environment of the provider 110.

Figure 11:
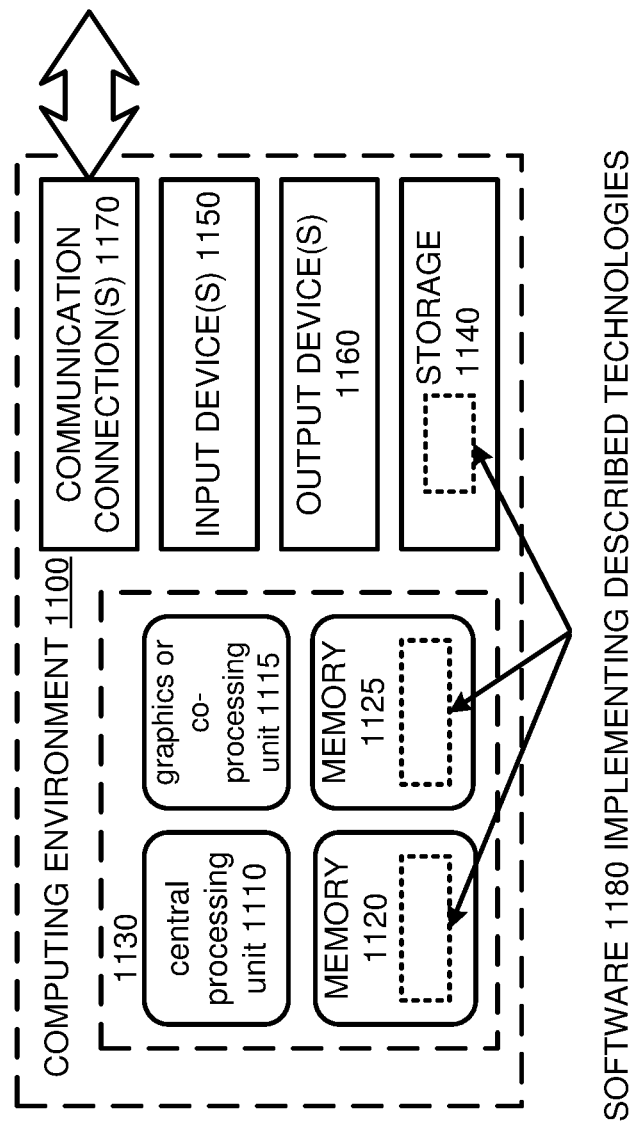
FIG. 11 depicts a generalized example of a suitable computing environment in which the described innovations may be implemented.

FIG. 11 depicts a generalized example of a suitable computing environment in which the described innovations may be implemented. Referring to FIG. 11, the computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations (e.g., functionalities) described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached Figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A computer-readable storage medium storing computer-executable instructions for causing one or more computing devices to perform a method for provisioning digital certificates in a compute service environment, the method comprising:
   authorizing a customer entity for using and/or controlling a network resource in the compute service environment;
   issuing a digital certificate to the customer entity, wherein the digital certificate is associated with the network resource and is issued for a limited duration period; and
   conditioning reissuance of the digital certificate on whether the customer entity is still using and/or controlling the network resource in the compute service environment.

2. The computer-readable storage medium according to claim 1, further including:
   automatically reissuing the digital certificate for another limited duration period, if the customer entity is still using and/or controlling the network resource in the compute service environment.

3. The computer-readable storage medium according to claim 2, wherein:
   the automatically reissuing takes place without receiving a certificate reissue request from the customer entity.

4. The computer-readable storage medium according to claim 1, wherein the authorizing is in connection with a first network resource and a second network resource, and the method further includes:
   receiving a request for issuing the digital certificate in connection with the second network resource; and
   automatically issuing the digital certificate in connection with the second network resource, wherein the issuance of the digital certificate is conditioned upon usage and/or control of the first network resource by the customer entity.

5. The computer-readable storage medium according to claim 4, further including:
   conditioning reissuance of the digital certificate in connection with the second network resource on whether the customer entity is still in control of, and/or using, the first network resource.

6. A method for provisioning digital certificates in a compute service environment, comprising:
   using, in the compute service environment, a network resource associated with a customer entity, wherein the customer entity is in possession of a public key information issued to the customer entity; and
   automatically reissuing the public key information for use by the customer entity, the reissuing based on whether the network resource is associated with the customer entity.

7. The method according to claim 6, wherein the reissuing takes place automatically and without receiving a reissue request from the customer entity.

8. The method according to claim 6, wherein the network resource is at least one of a virtual machine, a database, and/or a service used and/or controlled by the customer entity.

9. The method according to claim 6, further comprising:
   granting the customer entity access to the network resource; and
   automatically issuing the public key information to the customer entity in connection with using the network resource by the customer entity.

10. The method according to claim 6, the method further comprising determining whether the network resource is at least one of:
    used by the customer entity;
    paid for by the customer entity; or
    controlled by the customer entity.

11. The method according to claim 6, wherein:
    the public key information associates a public cryptographic key with the customer entity; and
    the public cryptographic key has a corresponding private cryptographic key.

12. The method according to claim 11, further including:
    generating the public cryptographic key and the private cryptographic key upon authorizing the customer entity for usage and/or control of the network resource in the compute service environment.

13. The method according to claim 12, wherein the private cryptographic key is inaccessible to the customer entity.

14. The method according to claim 6, comprising:
    receiving a request from the customer entity to issue the public key information, the public key information comprising a digital certificate;
    authorizing the customer entity in connection with the digital certificate; and
    upon successful authorization of the customer entity, issuing the digital certificate, wherein the digital certificate identifies the network resource.

15. The method according to claim 14, wherein the network resource is a virtual machine and the authorizing comprises:
    associating the customer entity with the virtual machine in exchange for a fee; and
    launching the virtual machine for use by the customer entity.

16. A network-based multi-tenant service that provides computing resources for use by customer entities, comprising:
    computer-readable memory storing instructions that are executable by one or more processors to perform actions comprising:
      receiving a request from a customer entity for a virtual machine and a cryptographic key associated with the virtual machine;
      in response to the request, authorizing the customer entity for using the virtual machine and for issuance of the cryptographic key;
      upon completing the authorization:
        launching the virtual machine for the customer entity;
        issuing the cryptographic key to the customer entity, wherein the cryptographic key is associated with usage of the virtual machine by the customer entity; and
        reissuing the cryptographic key based on whether the customer entity is still using the virtual machine.

17. The network-based multi-tenant service of claim 16, the actions further including:

automatically reissuing the cryptographic key upon receiving:
  an indication that the customer entity is still using the virtual machine; and
  an indication that the customer entity is still requesting a digital certificate for the virtual machine.

18. The network-based multi-tenant service of claim 16, the actions further including:
automatically reissuing the cryptographic key upon receiving payment from the customer entity for continued use of the virtual machine and for reissuing the cryptographic key.

19. The network-based multi-tenant service of claim 16, wherein the cryptographic key is a public key associated with a digital certificate, and wherein authorizing the customer entity includes receiving payment from the customer entity for using the virtual machine and for the issuance of the digital certificate.

20. The network-based multi-tenant service of claim 16, wherein the virtual machine is associated with a customer account of the customer entity.

* * * * *